Nov. 25, 1958 — E. K. MILLS, JR — 2,861,626
SAFETY SEAT FOR VEHICLES
Filed Sept. 7, 1954 — 2 Sheets-Sheet 2
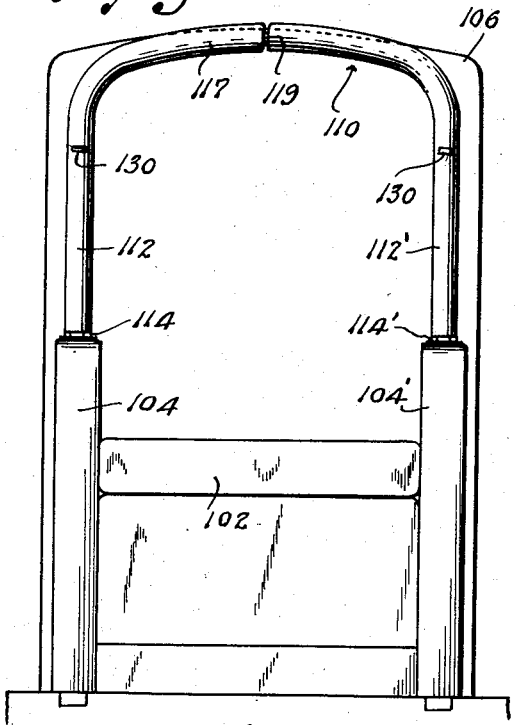
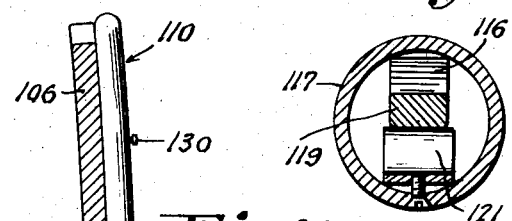
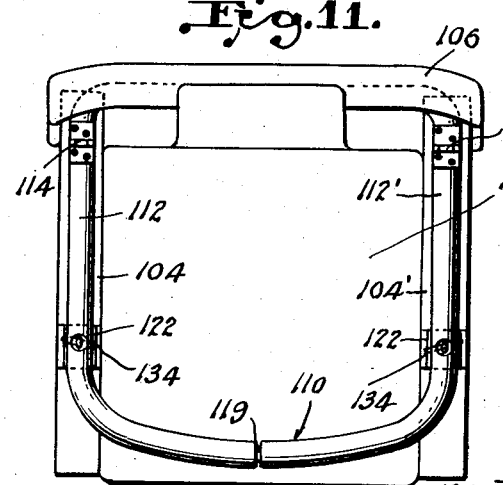
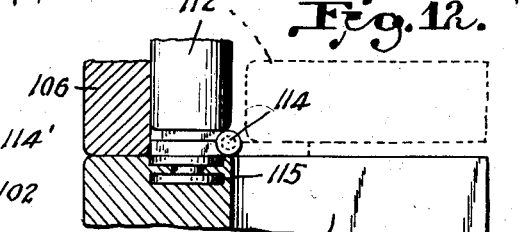
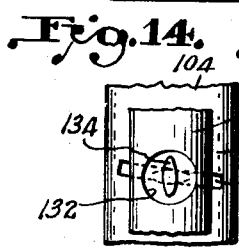
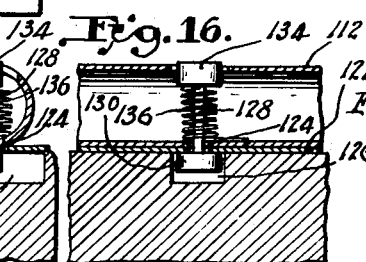
INVENTOR
Edward K. Mills, Jr.
ATTORNEY _United States Patent Office_

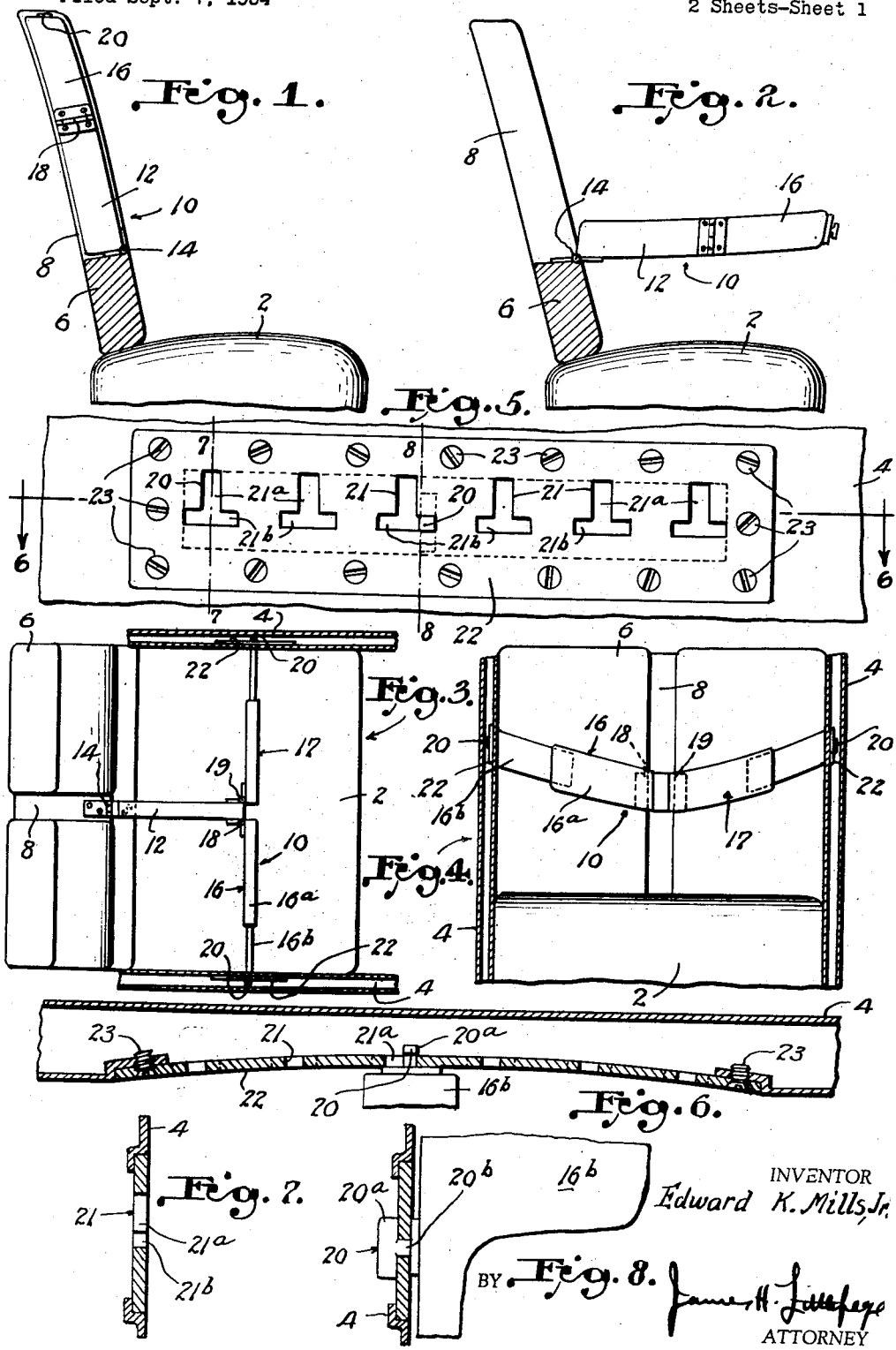

2,861,626
Patented Nov. 25, 1958

2,861,626

SAFETY SEAT FOR VEHICLES

Edward K. Mills, Jr., Mendham, N. J.

Application September 7, 1954, Serial No. 454,579

5 Claims. (Cl. 155—189)

This invention relates to safety seats for vehicles and, more particularly, to device for preventing injury to vehicle occupants upon crash or other sudden stopping of the vehicle. The invention is designed for automobile use and aircraft use, one form of the invention being more adaptable for conventional automobile use and the other form of the invention being more adaptable for airplane and sports car use.

The primary object of the invention is to provide a rigid brace, cushioned or padded on the inside, removably disposed across a vehicle seat immediately in front of an occupant so that if the vehicle crashes or for any reason stops suddenly, the occupant will not be thrown forwardly out of his seat. In the case of automobiles, the problem of passenger safety has increased with the development of high speed highways and higher speed cars to the point where a large percentage of accidents occur to vehicle passengers not as a result of the external forces of crashes which demolish the vehicle, but entirely because the passengers are thrown against the windshield, instrument panel, or from the vehicle rear seat. In fact, such accidents often occur even though the vehicle itself does not collide and even in cases where the vehicle is not traveling at high speed. As previously stated, the invention is equally suitable for airplane use.

In the case of automobile use, the invention also provides a simple inside locking device whereby the fastening or hooking of the rigid braces to the doors of the car locks the doors on the inside, and secures them against opening or "forcing" from the outside by intruders when the car is stopped or slowed by traffic congestion or traffic lights in city areas. Similarly, the inside locking of the car doors by the rigid braces eliminates the danger of children falling out of a moving car to death or serious injury as a result of manipulation of the door handles and the accidental unlocking of the standard car door locks as a result thereof. A safety factor against this type of child mishap and parental relief from constant worry about accidental opening of car doors is thus provided, for since the unfastening or unhooking of the rigid brace must be at once apparent to the adult occupants of the car, it becomes almost impossible for a child to unhook the brace and simultaneously manipulate the door handle, without prior detection.

The third object of the invention is to provide a passenger safety brace which, in operative position, by extending firmly across in front of the occupant, serves also as a solid support for attachable tray or rack for utilitarian and recreational purposes such as picnic, game, reading and smoking uses while the car or aircraft is in motion. This embodiment of the invention is not only of use, convenience and pleasure for automobile travel but also most adaptable for airplane seats in connection with the comfortable eating of meals served on trays while in flight.

In the case of the form of the invention particularly adaptable for airplane use, a further object of the invention is to provide a self-operating signal effect so that when the safety device is moved to its upward inoperative position, it will extend slightly upwardly above the back of the seat so as to serve as a warning to the passenger attendant that the safety device is not in use. The familiar procedure in airplane travel is for the passenger attendant, before all take-offs and landings, or when rough passage is anticipated, to walk up and down the aisle to see that safety belts are fastened. This is not only dangerous to the passenger attendant, if the airplane is in flight, but it sometimes entails the waking of a sleeping passenger. In accordance with this invention it is intended to provide a safety brace which may not only be seen by the passenger attendant if it is not in place, but which may also be placed in opeartive position with ease and without arousing the passenger. The brace is, of course, readily movable either to operative or inoperative position by automobile or airplane passengers.

The safety, locking, and other objects of the invention will be apparent from the following specification and drawings in which:

Fig. 1 is a side elevation, partly broken away, illustrating the retracted position of the brace of the first embodiment of the invention as applied to an automobile or aircraft seat;

Fig. 2 is a view similar to Fig. 1, but showing the brace in forwardly extended position;

Fig. 3 is a plan view showing the brace in closed, normal operating position, with brace fastening to car doors on inside and locking them;

Fig. 4 is an elevation, looking rearwardly, of the brace as shown in Fig. 3;

Fig. 5 is an elevation showing the locking plate for holding the free end of a cross-arm;

Figs. 6, 7 and 8 are cross-sections along the lines 6—6, 7—7 and 8—8 of Fig. 5;

Fig. 9 is an elevation, looking rearwardly, of a second form of the invention showing the brace embodied therein in retracted position;

Fig. 10 is a side elevation of the brace as illustrated in Fig. 9;

Fig. 11 is a plan view showing the brace in extended position;

Fig. 12 is a fragmentary section illustrating the detail of the swivel hinge mounting of the braces;

Fig. 13 is a fragmentary section illustrating an adjustable locking arrangement for the ends of the hooked arms;

Fig. 14 is a plan view showing the details of the arm locking mechanism;

Figs. 15 and 16 are enlarged cross-sections showing the details of the arm locking mechanism; and, Fig. 17 is a fragmentary section along the line 17—17 of Fig. 13 showing the details of the adjustable connection between the free ends of the hooked arms.

Referring now to the drawings in which like reference numerals denote similar elements, the embodiment of the invention illustrated in Figs. 1 to 8 inclusive, is shown as applied to a 4 door vehicle's rear seat 2, in this instance the seat of an automobile having the usual doors at the side diagrammatically illustrated at 4, or the seat of an aircraft. It will be understood that the automobile and door structures are entirely conventional and may be of any of the various models of passenger cars widely used, and since the vehicle structure is not germane to the invention it has been excluded from the drawings, the only important variation being that the seat back 6 is slotted as indicated at 8.

The slotted portion of the seat back is similar to the familiar provision for housing a pivoted arm rest sometimes provided in the back seat of a passenger vehicle.

The safety support indicated generally at 10 consists of a divider arm 12 pivoted at one end, as indicated at 14, to the seat back so that it may be swung upwardly and rearwardly to be housed in slot 8 or extended forwardly so as to lie above seat 2. Pivot 14 extends horizontally and transversely of the vehicle and should be most sturdy. Telescopically extensible cross arms 16, 17 are connected by pivots 18 and 19 to the free end of arm 12 and are provided with a T-shaped hasp 20 at their free end for releasable connection in selected inverted T-shaped slots 21 in plates 22 suitably fastened as by screws 23 to the inner sides of doors 4. The cross arms are each composed of a hollow sleeve section 16a in the case of cross arm 16 and a solid section 16b sliding in the hollow sleeve section. Thus, the effective lengths of the cross arms may be increased for normal use, and decreased for stowing in slot 8.

In normal operation safety support 10 is disposed so that arm 12 or divider arm 12 extends forwardly and cross arms 16, 17 extend transversely across the laps of occupants of seat 2 so that, in event the vehicle stops suddenly, cross arms 16 and 17 will prevent the occupants from being thrown forwardly from the seat. The fastening connections at the free ends of arms 16, 17 will hold doors 4 closed (each door pulling against the other) so that even though the vehicle might spin, the doors will be prevented from flying open and the occupants will thus not be flung out of the vehicle. When the vehicle stops and the occupants wish to get out, arms 16, 17 are unfastened from doors 4 by releasing pins. Arms 16, 17 may be swung so as to extend forwardly from single arm or divider arm 12 and the assembly may be housed in slot 8 by swinging the arms upwardly about pivots 14. It is preferred that the assembly shall nest closely within slot 8 so that it will be held in its housed position, and ready for re-use by reversing the steps recited above.

It will be apparent from the detailed illustrations in Figs. 5 to 8, inclusive, that the free ends of cross arms 16, 17 may be adjusted forwardly and rearwardly to suit the girth of the passenger by engaging T-shaped pin 20 in a forward or rear slot 21. The head 20a of pin 20 fits through the stem 21a of slot 21, but only the stem 20b can fit in the head 21b of slot 21. Thus, by inserting the head 20a of pin 20 in the stem 21a of slot 21, and by moving the free end of the cross arm slightly down inwardly and forwardly or rearwardly, pin 20 becomes trapped in slot 21 so as to hold the cross arm against accidental removal. By reversing the process, pin 20 may be removed from slot 21 so as to free the associated cross arm.

The embodiment of the invention illustrated in Figs. 9 to 17 inclusive is particularly suited for the seat, such as the individual seat 102, of a sports car or airplane, the latter adaptation being the more likely environment for the invention. Seat 102 is conventionally provided with fixed side arms 104, 104' and back 106.

The safety support indicated generally at 110 consists of a pair of inwardly hooked arms 112, 112' pivoted at 114, 114' on swivels 115, set in the rear ends of fixed side arms 104, 104' adjacent their junctures with seat back 106.

The free end of inwardly hooked arm 112 is hollow, as indicated at 117, and provided with a series of rack teeth 116, while the free end of inwardly hooked arm 112' is reduced in thickness as indicated at 119 and provided with a mating set of rack teeth 116'. A leaf spring 121 affixed to the rear of the inner side of hollow portion 117 in arm 112 normally presses teeth 116, 116' into locking engagement with one another so as to hold together. However, by forcing the reduced end 119 of arm 112' rearwardly so as to compress spring 121, the end of the arm 112' may be telescoped inwardly or outwardly of arm 112 and, hence, the girth of the arms may be adjusted.

A suitable hold-down is provided to prevent accidental lifting of hooked arms 112, 112' from seat arms 104, 104', one such mechanism being detailed in Figs. 14 to 17, inclusive. Since the hold-downs are similar only one will be described.

Arm 104 is provided with a plate 122 on its top, and plate 122 has a curved narrow slot 124 overlying a wider, similarly curved recess 126 in arm 104. A locking pin 128 having a T-head 130 is rotatably mounted in a recess through arm 104, the top of arm 104 having a cut-out 132 to provide access to a finger piece 134 on the top end of locking pin 128. A coil spring 136 surrounding locking pin 128 and engaging between finger-piece 134 and the lower inside of arm 112 yieldably holds the pin in place. T-head 130 of locking pin 128 can engage lengthwise through slot 124 in plate 122 and into slot 126 in arm 104 but, when finger piece 134 is turned 90°, the ends of T-head 130 become trapped behind the edges of slot 124. When so fastened, arms 104, 104' may be adjusted laterally, they will not pivot upwardly until finger pieces 134 are turned so as to free T-heads 130 from slots 124.

In normal use, inwardly hooked arms 112, 112' extend forwardly and enclose an occupant of seat 102 so that the occupant cannot be thrown, forward or upward, from the seat in event the vehicle, such as an airplane, crashes or encounters severe turbulence. The flat tops of arms 112, 112' provide a tray support or magazine rest, when disposed in their normal operating position.

When the occupant of seat 102 wishes to get out of the seat, finger pieces 134 are turned, and arm 112' is withdrawn from the hollow end of 117 of arm 112, and the arms may then be raised so as to extend upwardly along seat back 106. In its movement from operative to inoperative position, arm 112 may be rotated around swivel 115 to clear the occupant of the seat, and, of course, arm 112' may be similarly moved. It is of particular importance that if either or both of arms 112, 112' be raised to inoperative position, their condition will be readily observed by the airplane hostess so that she can tell, without leaving her position at the rear of the airplane whether or not all the passengers are properly safeguarded. If necessary, the arms may be swung from inoperative to operative position over a sleeping passenger slumped in the seat.

The embodiments of the invention detailed above are not limited precisely to the structures illustrated and described, but are intended to cover all substitutions, modifications and equivalents within the scope of the following claims.

I claim:

1. A safety seat for vehicles, comprising a seat having side arms and a back joined together, a pair of oppositely inward bent arms swiveled for universal movement to said side arms adjacent their juncture with the back and independently movable with respect to one another, said bent arms being swingable between a retracted position in which they are disposed upwardly and parallel to the back and an extended position in which they extend forwardly over said side arms, and means for releasably connecting together the free ends of said bent arms.

2. A safety seat for vehicles, comprising a seat having side arms and a back joined together, a pair of oppositely inward bent arms swiveled for universal movement to said side arms adjacent their juncture with the back, and independently movable with respect to one another, said bent arms being swingable between a retracted position in which they are disposed upwardly and parallel to the back and an extended position in which they extend forwardly over said side arms, recess means in said back substantially complementary with said bent arms and respectively disposed for housing said bent arms when the latter are retracted, and means for releasably connecting together the free ends of said bent arms.

3. A safety seat for vehicles, comprising a seat having side arms and a back joined together, a pair of oppositely inward bent arms swiveled for universal movement to said side arms adjacent their juncture with the back and independently moveable with respect to one another, said bent arms being swingable between a retracted position in which they are disposed upwardly and parallel to the back and an extended position in which they extend forwardly over said side arms, one of said bent arms having an inwardly open recess in the free end thereof, the free end of the other of said arms slidably fitting in said recess, and means for releasably connecting together the free ends of said bent arms.

4. A safety seat for vehicles, comprising a seat having side arms and a back joined together, a pair of bent arms swiveled for universal movement to said side arms adjacent their juncture with the back and independently movable with respect to one another, each of said bent arms having a straight portion contiguous to the swivel and a free end portion curving inwardly so as to extend partially over the seat when the arms are extended, said bent arms being swingable between a retracted position in which they are disposed upwardly and parallel to the back and an extended position in which they extend forwardly over said side arms, and means for releasably connecting together the free ends of said bent arms.

5. The combination claimed in claim 4, and means for maintaining said bent arms in extended position, comprising slot means in said seat arms, and headed pin means on said bent arms releasably engaging said slot means.

References Cited in the file of this patent

UNITED STATES PATENTS

| | | |
|---|---|---|
| 880,914 | Peterson | Mar. 3, 1908 |
| 1,199,306 | Riley | Sept. 26, 1916 |
| 1,405,309 | Matthews | Jan. 31, 1922 |
| 1,724,569 | Elliott | Aug. 13, 1929 |
| 1,841,954 | Jellineck | Jan. 19, 1932 |
| 1,892,048 | Genung | Dec. 27, 1932 |
| 2,084,448 | Merchant | June 22, 1937 |
| 2,337,480 | Logan | Dec. 21, 1943 |
| 2,346,871 | Provenzano | Apr. 18, 1944 |
| 2,668,583 | Singer | Feb. 9, 1954 |
| 2,670,967 | Kean | Mar. 2, 1954 |